United States Patent
Fuller et al.

(10) Patent No.: US 10,632,450 B2
(45) Date of Patent: *Apr. 28, 2020

(54) FORMATION OF HIGH SURFACE AREA METAL-ORGANIC FRAMEWORKS

(71) Applicant: NUMAT TECHNOLOGIES, INC., Skokie, IL (US)

(72) Inventors: Patrick Fuller, Chicago, IL (US); Mitchell Hugh Weston, Evanston, IL (US); William Morris, Chicago, IL (US); William Hoover, Chicago, IL (US)

(73) Assignee: NUMAT TECHNOLOGIES, INC., Skokie, IL (US)

( * ) Notice: Subject to any disclaimer, the term of this patent is extended or adjusted under 35 U.S.C. 154(b) by 148 days.

This patent is subject to a terminal disclaimer.

(21) Appl. No.: 15/935,356

(22) Filed: Mar. 26, 2018

(65) Prior Publication Data

US 2018/0272315 A1   Sep. 27, 2018

Related U.S. Application Data

(63) Continuation of application No. 14/956,223, filed on Dec. 1, 2015, now Pat. No. 9,925,516.

(60) Provisional application No. 62/086,514, filed on Dec. 2, 2014.

(51) Int. Cl.
| | |
|---|---|
| *B01D 53/04* | (2006.01) |
| *B01J 20/22* | (2006.01) |
| *B01J 20/28* | (2006.01) |
| *B01D 53/02* | (2006.01) |

(52) U.S. Cl.
CPC ............ *B01J 20/226* (2013.01); *B01D 53/02* (2013.01); *B01J 20/28011* (2013.01); *B01J 20/28066* (2013.01); *B01J 20/28092* (2013.01); *B01D 2253/204* (2013.01); *B01D 2259/4525* (2013.01); *B01J 20/28097* (2013.01); *Y02C 10/08* (2013.01)

(58) Field of Classification Search
CPC .. B01D 53/02; B01D 53/04; B01D 2253/204; B01D 2259/4525; Y02C 10/08; F17C 11/00; B01J 20/226; B01J 20/28011; B01J 20/28066; B01J 20/28092; B01J 20/28014; B01J 20/28097
USPC .......... 96/108; 95/900, 902; 206/0.7
See application file for complete search history.

(56) References Cited

U.S. PATENT DOCUMENTS

| | | | |
|---|---|---|---|
| 7,524,444 B2 | 4/2009 | Hesse et al. | |
| 9,925,516 B2* | 3/2018 | Fuller | B01J 20/226 |
| 2009/0133576 A1 | 5/2009 | Schubert et al. | |
| 2010/0239512 A1 | 9/2010 | Morris et al. | |
| 2011/0011803 A1 | 1/2011 | Koros | |
| 2013/0121911 A1 | 5/2013 | Nenoff et al. | |
| 2014/0208650 A1 | 7/2014 | Gaab et al. | |
| 2015/0094202 A1 | 4/2015 | Dolan et al. | |

OTHER PUBLICATIONS

Li, H. et al., "Design and Synthesis of an Exceptionally Stable and Highly Porous Metal-Organic Framework," Nature, vol. 402, No. 18, pp. 276-279, (1999).
Ferey, G., "Hybrid Porous Solids: Past, Present, Future," Chemical Society Reviews, vol. 37, pp. 191-214, (2008).
Farha, O. K. et al., "De Novo Synthesis of a Metal-Organic Framework Material Featuring Ultrahigh Surface Area and Gas Storage Capacities," Nature Chemistry, vol. 2, pp. 944-948, (2010).
Furukawa, H., et al., "Ultrahigh Porosity in Metal-Organic Frameworks," Science, vol. 329, pp. 424-428, (2010).
Chae, H. K. et al., "A route to high surface area, porosity and inclusion of large molecules in crystals," Nature, vol. 427, pp. 523-527, (2004).
Nelson, A. P. et al., "Supercritical Processing as a Route to High Internal Surface Areas and Permanent Microporosity in Metal-Organic Framework Materials," J. Am. Chem. Soc., vol. 131, pp. 458-460, (2009).
Farha, O. K. et al., "Metal-Organic Framework Materials with Ultrahigh Surface Areas: Is the Sky the Limit?" Journal of the American Chemical Society, vol. 134, pp. 15016-15021, (2012).
Ergun, S. et al., "Fluid Flow Through Randomly Packed Columns and Fluidized Beds," Industrial and Engineering Chemistry, vol. 41, No. 6, pp. 1179-1184, (1952).
Peterson, et al., "Effects of Pelletization Pressure on the Physical and Chemical Properties of the Metal-Organic Frameworks Cu3(BTC)2 and UiO-66," Microporous and Mesoporous Materials, vol. 179, pp. 48-53, (2013).
Hu, X. et al., "Development of a Semiautomated Zero Length Column Technique for Carbon Capture Applications: Rapid Capacity Ranking of Novel Adsorbents," Ind. Eng. Chem. Res., vol. 54, pp. 6772-6780, (2015).
Bazer-Bachi, D. et al., "Towards industrial use of metal-organic framework: Impact of shaping on the MOF properties," Powder Technology, vol. 225, pp. 52-59, (2014).
Peterson, G. W., et al., "Engineering UiO-66-NH2 for Toxic Gas Removal," Ind. Eng. Chem. Res., vol. 53, pp. 701-707, (2014).
Ren, J. et al., "A more efficient way to shape metal-organic framework (MOF) powder materials for hydrogen storage applications," International Journal of Hydrogen Energy, vol. 40, pp. 4617-4622, (2015).
Finsy, V. et al., "Separation of CO2/CH4 mixtures with the MIL-53(Al) metal-organic Framework," Microporous and Mesoporous, vol. 120, pp. 221-227, (2009).
Wang, L. J. et al., "Synthesis and Characterization of Metal-Organic Framework-74 Containing 2, 4, 6, 8, and 10 Different Metals," Inorg. Chem., vol. 53, pp. 5881-5883, (2014).

* cited by examiner

*Primary Examiner* — Frank M Lawrence, Jr.
(74) *Attorney, Agent, or Firm* — The Marbury Law Group, PLLC

(57) ABSTRACT

A metal-organic framework (MOF) structure comprising at least one metal ion and at least one multidentate organic ligand which is coordinately bonded to said metal ion, and a scaffold.

14 Claims, No Drawings

FORMATION OF HIGH SURFACE AREA METAL-ORGANIC FRAMEWORKS

FIELD

The embodiments of the present invention are directed to the formation of high-surface-area metal-organic frameworks (MOFs) into agglomerated or single-crystal bodies, specifically in a manner that retains the gravimetric surface area of the active material.

BACKGROUND

Extensive research over the past few years has been focused on the synthesis and characterization of microporous materials with high internal surface areas. Metal-organic frameworks (MOFs), a subset of these materials, have shown promise in a wide range of gas storage and separation applications. MOFs are composed of at least one multidentate organic linker and at least one metal ion, forming a low-density crystalline structure with gas interaction properties. Their development has accelerated in the past decade because of favorable performance characteristics relative to other solutions, stemming from differentials in internal surface area, porosity and tunability (see Farha, O. K., et al., De novo synthesis of a metal-organic framework material featuring ultrahigh surface area and gas storage capacities. Nature Chemistry, 2010. 2(11): p. 944-948; Furukawa, H., et al., Ultrahigh Porosity in Metal-Organic Frameworks. Science, 2010. 329(5990): p. 424-428; Chae, H. K., et al., A route to high surface area, porosity and inclusion of large molecules in crystals. Nature, 2004. 427(6974): p. 523-527; Nelson, A. P., et al., Supercritical Processing as a Route to High Internal Surface Areas and Permanent Microporosity in Metal-Organic Framework Materials. Journal of the American Chemical Society, 2009. 131(2): p. 458; Farha, O. K., et al., Metal-Organic Framework Materials with Ultrahigh Surface Areas: Is the Sky the Limit? Journal of the American Chemical Society, 2012. 134(36): p. 15016-15021; and Ergun, S., Fluid Flow through Packed Columns. Chem. Eng. Prog. 1952. 48). The use of sorbents in industrial and commercial applications requires materials with specific particle sizes and pore size distributions, which is often accomplished with mechanical material formation techniques such as agglomeration, grinding, pressing, and extruding. Existing mechanical formation techniques have shown to significantly decrease the surface area of these materials (see Peterson G. W., et al. Effects of pelletization pressure on the physical and chemical properties of the metal-organic frameworks Cu3(BTC)2 and UiO-66. Microporous and Mesoporous Materials, 179 (2013) 48-53; Hu, X., et al. Development of a Semiautomated Zero Length Column Technique for Carbon Capture Applications: Rapid Capacity Ranking of Novel Adsorbents. Ind. Eng. Chem. Res, 54 (2015) 6772-6780; Bazer-Bachi, D., et al. Towards industrial use of metal-organic framework: Impact of shaping on the MOF properties. Powder Technology, 255 (2014) 52-59; and U.S. Pat. No. 7,524,444 (Hesse et al.)). In rare examples, the surface area of the material has not been significantly affected by formation, although these examples only use low formation pressures (<20,000 psi) and low-surface-area materials (<1,100 $m^2/g$) (See Peterson G. W., et al. Effects of pelletization pressure on the physical and chemical properties of the metal-organic frameworks Cu3(BTC)2 and UiO-66. Microporous and Mesoporous Materials, 179 (2013) 48-53; and Peterson, G. W., et al. Engineering UiO-66-NH2 for Toxic Gas Removal. Ind. Eng. Chem. Res. 53 (2014) 701-707). These techniques all impact the performance ceiling of this material class by imposing constraints on the surface area of the material used and formation pressure that can be utilized.

SUMMARY

The embodiments of the invention provide a novel formation technique for metal-organic frameworks (MOFs), wherein the material pores are protected by a reversible scaffold prior to formation. In more detail, the process described operates as follows: (1) protect the crystal micropores through the addition of scaffolding, (2) form the material through one of any established mechanical formation techniques, and (3) remove the scaffolding to re-open structural micropores.

Embodiments of the invention are drawn to (a) the formation of metal-organic framework powder into larger shapes without substantially reducing the gravimetric Brunauer-Emmett-Teller (BET) surface area, and (b) the integration of these formed materials into gas storage or separation systems. An embodiment relates to a metal-organic framework including the coordination product of at least one metal ion and at least one at least bidentate organic ligand, wherein said metal-organic framework is formed into a shape that maintains at least 65% of the gravimetric Brunauer-Emmett-Teller surface area of the as-synthesized powder.

Another embodiment relates to a method of using a metal-organic framework, comprising at least one metal ion and at least one at least bidentate organic ligand and formed into a shape that maintains at least 65% of the gravimetric Brunauer-Emmett-Teller surface area of the as-synthesized powder, including filling a vessel with a metal-organic framework and storing a gas in a metal-organic framework.

Another embodiment relates to the scaffold-assisted formation of a metal-organic framework including reacting at least one metal ion and at least one at least bidentate organic ligand, wherein said scaffolded metal-organic framework is grown into a single-crystal particle with a diameter greater than 0.05 mm, such as greater than 0.5 mm.

Another embodiment relates to a method of using a single-crystal metal-organic framework with a diameter greater than 0.05 mm, such as greater than 0.5 mm comprising at least one metal ion and at least one at least bidentate organic ligand, including filling a vessel with a metal-organic framework and storing a gas in a metal-organic framework.

DETAILED DESCRIPTION

The present inventor realized that the MOF material formation described in the background section is generally carried out in the absence of a scaffold. In some cases, a binder is utilized in the MOF pellets; however, the binder is not removed prior to use of the MOF for gas separation or storage (see Ren, J., et al., A more efficient way to shape metal-organic framework (MOF) powder materials for hydrogen storage applications. International Journal of Hydrogen Energy, 40 (2015) 4617-4622; and Finsy, V., et al., Separation of CO2/CH4 mixtures with the MIL-53(Al) metal-organic framework. Microporous and Mesoporous Materials, 120 (2009) 221-227). The present inventor realized that inclusion of the binder (or a scaffold) in the MOF during use adversely alters the properties and performance of the formed material. Thus, in an embodiment of the invention, the crystal micropores of a MOF powder are protected by the addition of scaffolding. The MOF monolith, such as agglomerated MOF particles, is formed by using any suitable mechanical formation techniques on the scaffolded MOF powder. The scaffolding is then removed after mechanical formation to re-open structural micropores in the MOF monolith prior to use of the MOF monolith for gas separation or storage.

Sorbents are commonly used in applications such as gas storage, gas purification, and catalysis. The sorbent market consists primarily of activated carbon and zeolites, which are chosen for use on a per-application basis. Metal-organic frameworks are positioned to enter this market, offering a sorbent option targeting applications where performance is paramount.

The metal-organic framework materials as used in embodiments of the present invention contain micropores large enough to allow gas molecules to enter the material. Micropores are conventionally defined as pores less than 2 nm wide, which encompass the majority of metal-organic framework crystals. Some metal-organic frameworks contain pores on the low end of the mesoporous regime, conventionally defined as pores in the 2-50 nm range.

Metal-organic frameworks are composed of at least one multidentate organic linker and at least one metal ion. Metal ions of MOFs include, but not limited to, $Li^+$, $Na^+$, $K^+$, $Rb^+$, $Be^{2+}$, $Mg^{2+}$, $Ca^{2+}$, $Sr^{2+}$, $Ba^{2+}$, $Sc^{3+}$, $Y^{3+}$, $Ti^{4+}$, $Hf^{4+}$, $V^{5+}$, $V^{4+}$, $V^{3+}$, $Nb^{3+}$, $Ta^{3+}$, $Cr^{3+}$, $Cr^{2+}$, $Mo^{3+}$, $W^{3+}$, $Mn^{3+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Al^{3+}$, $Ga^{3+}$, $In^{3+}$, $Si^{4+}$, $Si^{2+}$, $Ge^{4+}$, $Ge^{2+}$, $Sn^{4+}$, $Sn^{2+}$, $Bi^{5+}$, $Bi^{3+}$, $Cd^{2+}$, $Mn^{2+}$, $Tb^{3+}$, $Gd^{3+}$, $Ce^{3+}$, $La^{3+}$ and $Cr^{4+}$, and combinations thereof.

Metal-organic frameworks have the highest gravimetric surface area (theoretically up to 14,500 $m^2/g$) of any currently known material (see Farha, O. K., et al., Metal-Organic Framework Materials with Ultrahigh Surface Areas: Is the Sky the Limit? Journal of the American Chemical Society, 2012. 134(36): p. 15016-15021). Additionally, metal-organic frameworks have greater design flexibility than either zeolites or activated carbon, enabling the creation of micropores of any size with sub-angstrom accuracy.

Micropores and mesopores enable high-density gas storage and geometric gas separation, but present performance limitations in real-world systems due to (a) mass transfer limitations and (b) pressure drop. Mass transfer limitations can be addressed by reducing particle size, but small particles increase the pressure drop of gas traveling through the system. This increases the amount of required compression, adding to the process operating cost. These trade-offs are well understood and are conventionally modeled by the Ergun equation, which predicts that the pressure drop across a vessel is inversely related to the square of the particle diameter (see Ergun, S., Fluid Flow through Packed Columns. Chem. Eng. Prog. 1952. 48). A common solution to this challenge, as originally developed for zeolites and activated carbon, is to agglomerate fine powder into larger particles. Here, powder is defined as material sized between 0.001 and 0.05 mm. The agglomerated pellets contain macropores, conventionally defined as pores greater than 50 nm, which enable rapid mass transfer. This step introduces additional variables into the system, which must be optimized through studies comparing parameters such as powder size, agglomerated particle size, microporosity, macroporosity, and tortuosity against mass transfer rate and pressure drop.

In low-flow storage applications, mass transfer and pressure drop do not strongly impact performance. Instead, the primary performance driver is material packing density. In these applications, high-pressure formation techniques are used to improve packing density in a vessel. In order to achieve optimal performance, pressures in excess of 100,000 psi are often used.

The application of sorbent formation techniques to metal-organic frameworks has been reviewed previously (see Peterson G. W., et al. Effects of pelletization pressure on the physical and chemical properties of the metal-organic frameworks Cu3(BTC)2 and UiO-66. Microporous and Mesoporous Materials, 179 (2013) 48-53; Hu, X., et al., Development of a Semiautomated Zero Length Column Technique for Carbon Capture Applications: Rapid Capacity Ranking of Novel Adsorbents. Ind. Eng. Chem. Res, 54 (2015) 6772-6780; Bazer-Bachi, D., et al. Towards industrial use of metal-organic framework: Impact of shaping on the MOF properties. Powder Technology, 255 (2014) 52-59; U.S. Pat. No. 7,524,444 (Hesse et al.)); Peterson, G. W., et al. Engineering UiO-66-NH2 for Toxic Gas Removal. Ind. Eng. Chem. Res. 53 (2014) 701-707); Ren, J., et al., A more efficient way to shape metal-organic framework (MOF) powder materials for hydrogen storage applications. International Journal of Hydrogen Energy, 40 (2015) 4617-4622; and Finsy, V., et al., Separation of CO2/CH4 mixtures with the MIL-53(Al) metal-organic framework. Microporous and Mesoporous Materials, 120 (2009) 221-227). These studies have shown that the high porosity of metal-organic frameworks decreases the mechanical stability of the material, and existing formation techniques destroy the micropore structure of materials with high gravimetric surface areas (defined here as greater than 1,100 $m^2/g$) (see Peterson G. W., et al. Effects of pelletization pressure on the physical and chemical properties of the metal-organic frameworks Cu3(BTC)2 and UiO-66. Microporous and Mesoporous Materials, 179 (2013) 48-53). Additionally, no metal-organic frameworks have been shown to withstand pressures in excess of 100,000 psi, limiting the use of high-density formation techniques for even low-surface-area materials (see Peterson G. W., et al. Effects of pelletization pressure on the physical and chemical properties of the metal-organic frameworks Cu3(BTC)2 and UiO-66. Microporous and Mesoporous Materials, 179 (2013) 48-53 and Peterson, G. W., et al. Engineering UiO-66-NH2 for Toxic Gas Removal. Ind. Eng. Chem. Res. 53 (2014) 701-707). This imposes a ceiling on material performance, as damaged metal-organic framework agglomerations will not perform as well as their crystalline powder counterparts.

The embodiments of the present invention provide a novel approach to maintaining the microporous structure of metal-organic framework powder. Namely, embodiments of the present invention introduce the concept of reversibly strengthening the metal-organic framework structure before the application of mechanical stress. In more detail, the process described operates as follows: (1) protect the crystal micropores through the addition of scaffolding, (2) form the material through one of any established mechanical formation techniques, and (3) remove the scaffolding to re-open structural micropores. This method provides a mechanism to create agglomerated particles without damaging crystal structure, removing the performance ceiling mentioned previously.

In the context of embodiments of the present invention, "agglomerated pellets" refer to arbitrarily shaped bodies, wherein the shaped body maintains at least 65%, such as at least 80%, for example 85-100%, including 90-99% of the gravimetric Brunauer-Emmett-Teller (BET) surface area of the as-synthesized powder. The minimum diameter of the agglomerated pellet is preferably greater than 0.05 mm, and more preferably between 0.2 and 2.0 mm, such as greater than 0.5 mm, for example 1 to 2 mm.

The scaffold may be any suitable material which is added to the MOF powder before the powder is mechanically processed (e.g., compressed) and which is removed after the MOF monolith (e.g., agglomerated MOF particles) is formed by mechanical processing. The scaffold may comprise any suitable solid or fluid material. In an embodiment, the scaffold comprises a liquid or a super critical fluid. The scaffold provides support while MOF crystals are mechanically and/or chemically formed into the macroporous materials. In an embodiment, the liquid scaffold is removed after the macroporous material is formed, such as by drying.

The scaffold may comprise a chemical and/or physical scaffold. A chemical scaffold chemically interacts with the MOF powder (e.g., forms a chemical bond with the MOF framework). For example, the chemical scaffold may include a molecule that forms a chemical bond with the framework of the MOF. A physical scaffold fills the pores in the MOF powder during the mechanical processing to reduce or prevent collapse of the MOF framework during mechanical processing, but does not necessarily chemically react with the MOF framework.

The scaffold differs from a templating agent in that a templating agent is used during the formation of MOF molecules from precursors and is then removed to leave empty space in the MOF molecules. In contrast, a scaffold is added to the MOF powder after the MOF molecules are already formed, and is used during mechanical forming of the powder into a solid body.

Suitable materials for use as scaffolds include, but are not limited to, a solvent (e.g., MeOH), an incompressible liquid (e.g., $H_2O$), an ionic liquid (e.g., 1-alkylpyridinium), a supercritical fluid (e.g., $CO_2$), a polymer (i.e., a solid material), an inorganic fluid (e.g., ammonia), or a hydrocarbon (e.g., benzene). Solvents include inorganic or organic solvents, for example alcohols, such as methanol and other organic solvents. Solvents may but do not have to dissolve the MOF framework material.

The metal-organic-framework powder may optionally be agglomerated in the presence of a chemical binder. The metal-organic-framework powder may optionally be agglomerated in the presence of a phase-changing heat sink material.

In the context of embodiments of the present invention, established mechanical formation techniques include but are not limited to: (a) granulation, (b) centrifugal agglomeration, (c) tablet pressing, (d) sintering, (e) extruding, (f) Nauta mixing, and (g) additive manufacturing. In one embodiment the mechanical formation techniques utilize a pressure of at least 25,000 psi, such as 50,000 to 200,000 psi to form the agglomerated pellets (e.g., a monolith) from a MOF powder. In one embodiment, the scaffold (e.g., a solvent) comprises at least 30 weight percent, such as 30 to 50 weight percent of the scaffolded MOF mixture (i.e., of the mixture of the MOF powder filled with the scaffold). The completed MOF structure (e.g., pelletized adsorbent after removal of the scaffold) comprises a bulk density between 0.1 and 1.0 kg/L and has a deliverable adsorption of at least 50%, such as 50-75% of the total adsorption capacity (i.e., less than 50% heel).

An embodiment of the present invention relates to embedding metal-organic frameworks into cross-linked polymers through the use of heat and mechanically induced pressure. These techniques are enabled by the use of scaffolding, and provide macroporous materials formed into shapes including but not limited to spheres, cylinders, thread, sheets, discs, and monoliths.

Another embodiment of the present invention relates to adding metal-organic frameworks with scaffolding into a system of monomers, crosslinkers, and immiscible solvents. This technique grows polymers around the particulate MOFs, forming spheres that precipitate at a critical mass. These techniques are enabled by the use of scaffolding, and provide macroporous materials without requiring large mechanical force.

In applications where mass transfer limitations are not a concern, such as long-term gas storage, the need for macroporous materials is replaced by (a) packing density maximization and (b) material handling safety. Powder exhibits low packing density, decreasing the volumetric performance of metal-organic-framework-based systems. Fine powder inhalation additionally presents the risk of silicosis-like symptoms, which presents a danger to material handlers.

The embodiments of the present invention present the utilization of the aforementioned scaffold workflow to synthesize metal-organic-framework crystals greater than 0.05 mm, such as greater than 0.5 mm in diameter. This is accomplished through the addition of a scaffold during the synthetic process, encouraging crystal propagation and increasing crystal size substantially. After scaffold removal, the product of this process is an as-synthesized material with high packing density and no danger of inhalation. In embodiments of the present invention, this technique is included as a formation method in the broader scaffolding workflow.

Another embodiment of the present invention relates to mechanically pressing the material without the presence of a binder material, such as through a tablet press or a centrifuge. While this approach does not provide the mass transfer of polymer embedding, it offers higher packing density. These techniques are enabled by the use of scaffolding, and provide macroporous materials formed into shapes including but not limited to spheres, cylinders, thread, sheets, discs, and monoliths.

The formed material according to embodiments of the invention can be used in any process in which a porous material provides an advantage over nonporous materials. Preferably, these applications include gas storage, gas purification, and catalysis.

For example, a gas storage and dispensing method includes disposing the physical adsorbent (i.e., the MOF monolith, such as agglomerated MOF particles described above which has been mechanically processed and from which the scaffold has been removed) having sorptive affinity for a gas in a vessel. The vessel may comprise any suitable gas storage vessel, such as a gas storage tank or cylinder, for example, a sub-atmospheric gas storage tank or cylinder. Any suitable gas may be used, such as hydrogen, oxygen, nitrogen or compound gas, such as a gas used in semiconductor processing, including arsine, phosphine, boron trifluoride, etc. The method further includes charging said gas to said vessel and adsorbing the gas on said physical adsorbent. After storing the adsorbed gas in the vessel, the adsorbed gas may be desorbed from the physical adsorbent by reducing the pressure at the outlet of the vessel.

In another example, the gas purification method comprises a method of separating a stream of two or more gases. The method includes providing a physical adsorbent described above having selectivity to one or more gases in said stream in one or more gas separation vessels. The gas separation vessels may comprise gas adsorption beds or tanks. The gas stream may include any suitable gases, such as the gases described above. The method also includes toggling one or more actuated valves to introduce and evacuate gases in said vessels. For example, the stream of two or more gases may be flown through one vessel, such as a first adsorption bed, to adsorb at least one gas from the stream to the adsorbent, while at least one other gas from the stream flows through the first bed without being adsorbed. Then the valves are toggled to redirect the stream of two or more gases through another vessel, such as a second adsorption bed, to adsorb at least one gas from the stream to the adsorbent, while at least one other gas flows through the second bed without being adsorbed. Meanwhile, a purge gas is provided to the first bed to desorb and remove the adsorbed gas from the adsorbent in the first bed. The process is then reversed to desorb the gas from the second bed while the gas is adsorbed in the first bed.

The following examples are meant to be illustrative rather than limiting on the scope of the claims.

Example 1

Pelletization of CuBTC.

CuBTC MOF was synthesized as a powder with an average particle size of 100 μm, and a powder BET surface area of 1,750 $m^2/g$ was measured. To scaffold, solvent was added to samples. The scaffold-MOF structure was pressed at varying pressures, and the scaffold was then removed under heat and vacuum. A correlation relating solvation and formation pressure to surface area and density was obtained.

TABLE 1

Pelletization of CuBTC at different pressures.

| Sample # | Pressure psi | Density $g/cm^3$ | Monolith Density, %[a] | Surface area $m^2/g$ (BET) | Surface area Retention, %[b] |
|---|---|---|---|---|---|
| 1 | 18,000 | 0.76 | 82 | 1,705 | 97 |
| 2 | 36,000 | 0.82 | 90 | 1,650 | 94 |
| 3 | 72,000 | 0.83 | 90 | 1,620 | 93 |
| 4 | 90,000 | 0.81 | 90 | 1,620 | 93 |

[a]Calculated assuming a single crystal density of 0.92 $g/cm^3$,
[b]Surface area retention assumes a pre-formed surface area of 1,750 $m^2/g$ for CuBTC. CuBTC refers to $Cu_3BTC_2$ (copper(II)-benzene-1,3,5-tricarboxylate), which is a MOF is based on copper(II) and trimesate ions.

Example 2

Pelletization of CuMOF-74.

CuMOF-74 was synthesized as a powder with an average dominant particle length of 50 μm, and a powder BET surface area of 1,250 $m^2/g$ was measured. To scaffold, solvent was added to samples. The scaffold-MOF structure was pressed at varying pressures, and the scaffold was then removed under heat and vacuum. A correlation relating solvation and formation pressure to surface area and density was obtained.

TABLE 2

Pelletization of CuMOF-74 at different pressures.

| Sample # | Pressure psi | Density $g/cm^3$ | Monolith Density, %[a] | Surface area $m^2/g$ (BET) | Surface area Retention, %[b] |
|---|---|---|---|---|---|
| 1 | 18,000 | 0.90 | 68 | 1,250 | 100 |
| 2 | 36,000 | 0.94 | 72 | 1,250 | 100 |
| 3 | 100,000 | 1.08 | 83 | 1,220 | 98 |
| 4 | 200,000 | 1.14 | 87 | 1,180 | 94 |

[a]Calculated assuming a single crystal density of 1.31 $g/cm^3$,
[b]Surface area retention assumes a pre-formed surface area of 1,250 $m^2/g$ for CuMOF-74. CuMOF-74 refers to the $Cu_2$(DOBDC) MOF where DOBDC = 2,5-dihydroxyterephalate. The MOF-74 structure is composed of infinite rods $Cu_3O_3(CO_2)_3$ and DOBDC linkers, where each metal ion is coordinated to three carboxyl, two hydroxyl groups, and a coordinated ligand.

Example 3

Production-Scale Pelletization of CuBTC.

CuBTC was synthesized as a powder with an average particle size of 100 μm, and a powder BET surface area of 1,750 $m^2/g$ was measured. To scaffold, solvent was added to samples in varying weight percentages. The scaffold-MOF structure was pressed at varying pressures using a 16-station automated pellet press capable of producing 500 tablets per minute. The scaffold was then removed under heat and vacuum. A correlation relating solvation and formation pressure to surface area and density was obtained.

TABLE 3

Automated pelletization of CuBTC at different solvations.

| Sample # | Solvent Loading weight % | Density $g/cm^3$ | Monolith Density, %[a] | Surface area Retention, %[b] |
|---|---|---|---|---|
| 1 | 18 | 0.75 | 82 | 83 |
| 2 | 26 | 0.74 | 82 | 86 |
| 3 | 33 | 0.66 | 73 | 91 |

[a]Calculated assuming a single crystal density of 0.92 $g/cm^3$,
[b]Surface area retention assumes a surface area of 1750 $m^2/g$ for CuBTC.

The following references teach aspects of the fabrication of MOFs and are hereby incorporated by reference:
1. Li, H., et al., Design and synthesis of an exceptionally stable and highly porous metal-organic framework. Nature, 1999. 402(6759): p. 276-279.
2. Ferey, G., Hybrid porous solids: past, present, future. Chemical Society Reviews, 2008. 37(1): p. 191-214.
3. Farha, O. K., et al., De novo synthesis of a metal-organic framework material featuring ultrahigh surface area and gas storage capacities. Nature Chemistry, 2010. 2(11): p. 944-948.
4. Furukawa, H., et al., Ultrahigh Porosity in Metal-Organic Frameworks. Science, 2010. 329(5990): p. 424-428.
5. Chae, H. K., et al., A route to high surface area, porosity and inclusion of large molecules in crystals. Nature, 2004. 427(6974): p. 523-527.
6. Nelson, A. P., et al., Supercritical Processing as a Route to High Internal Surface Areas and Permanent Microporosity in Metal-Organic Framework Materials. Journal of the American Chemical Society, 2009. 131(2): p. 458-+.
7. Farha, O. K., et al., Metal-Organic Framework Materials with Ultrahigh Surface Areas: Is the Sky the Limit? Journal of the American Chemical Society, 2012. 134(36): p. 15016-15021.
8. Ergun, S. Fluid Flow through Packed Columns. Chem. Eng. Prog. 1952. 48.
9. Peterson G. W., et al. Effects of pelletization pressure on the physical and chemical properties of the metal-organic frameworks Cu3(BTC)2 and UiO-66. Microporous and Mesoporous Materials, 179 (2013) 48-53.

10. Hu, X., et al. Development of a Semiautomated Zero Length Column Technique for Carbon Capture Applications: Rapid Capacity Ranking of Novel Adsorbents. Ind. Eng. Chem. Res, 54 (2015) 6772-6780.
11. Bazer-Bachi, D., et al. Towards industrial use of metal-organic framework: Impact of shaping on the MOF properties. Powder Technology, 255 (2014) 52-59.
12. U.S. Pat. No. 7,524,444 (Hesse et al.
13. Peterson, G. W., et al. Engineering UiO-66-NH2 for Toxic Gas Removal. Ind. Eng. Chem. Res. 53 (2014) 701-707.
14. Ren, J., et al., A more efficient way to shape metal-organic framework (MOF) powder materials for hydrogen storage applications. International Journal of Hydrogen Energy. 40 (2015) 4617-4622.
15. Finsy, V., et al. Separation of CO2/CH4 mixtures with the MIL-53(Al) metal-organic framework. Microporous and Mesoporous Materials, 120 (2009) 221-227.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A method of making a macroporous structure comprising a metal-organic framework (MOF), the method comprising:
   forming a MOF powder comprising synthesized MOF particles;
   mixing the formed MOF powder with a scaffold after the step of forming the MOF powder to provide a mixture;
   mechanically processing the mixture to form a macroporous structure; and
   removing the scaffold to re-open structural micropores from the macroporous structure, wherein the scaffold comprises a polymer, supercritical fluid, or hydrocarbon.

2. The method of claim 1, wherein the macroporous structure maintains at least 65% of the Brunauer-Emmett-Teller (BET) surface area of the MOF powder.

3. The method of claim 1, wherein mechanical processing comprises one or more of granulation, centrifugal agglomeration, tablet pressing, sintering, extruding, Nauta mixing, and additive manufacturing.

4. A method of making a macroporous structure comprising a metal-organic framework (MOF), the method comprising:
   forming a MOF powder comprising synthesized MOF particles;
   mixing the formed MOF powder with a scaffold after the step of forming the MOF powder to provide a mixture;
   mechanically processing the mixture to form a macroporous structure;
   removing the scaffold to re-open structural micropores from the macroporous structure; and
   embedding the mixture into a cross-linked polymer.

5. A method of making a macroporous structure comprising a metal-organic framework (MOF), the method comprising:
   forming a MOF powder comprising synthesized MOF particles;
   mixing the formed MOF powder with a scaffold after the step of forming the MOF powder to provide a mixture;
   mixing the MOF powder and the scaffold with one or more monomers, crosslinkers, immiscible solvents, and combinations thereof;
   mechanically processing the mixture to form a macroporous structure; and
   removing the scaffold to re-open structural micropores from the macroporous structure.

6. The method of claim 1, wherein the scaffold excludes a templating agent used during the formation of the MOF molecules from precursors.

7. The method of claim 1, wherein:
   the macroporous structure maintains at least 80% of the Brunauer-Emmett-Teller (BET) surface area of the MOF powder;
   the mechanically processing the mixture utilizes a pressure of at least 25,000 psi; and
   the scaffold comprises at least 30 weight percent of the mixture of the scaffold and the MOF powder.

8. The method of claim 1, wherein the MOF particles in the formed MOF powder are free of templated materials.

9. The method of claim 1, wherein the scaffold comprises the polymer.

10. The method of claim 1, wherein the scaffold comprises the supercritical fluid.

11. The method of claim 1, wherein the scaffold comprises the hydrocarbon.

12. The method of claim 5, wherein the scaffold comprises the monomers.

13. The method of claim 5, wherein the scaffold comprises the crosslinkers.

14. The method of claim 5, wherein the scaffold comprises the immiscible solvents.

* * * * *